C. W. STARK.
SEEDER.
APPLICATION FILED JUNE 15, 1909.
942,868.
Patented Dec. 7, 1909.
2 SHEETS—SHEET 1.
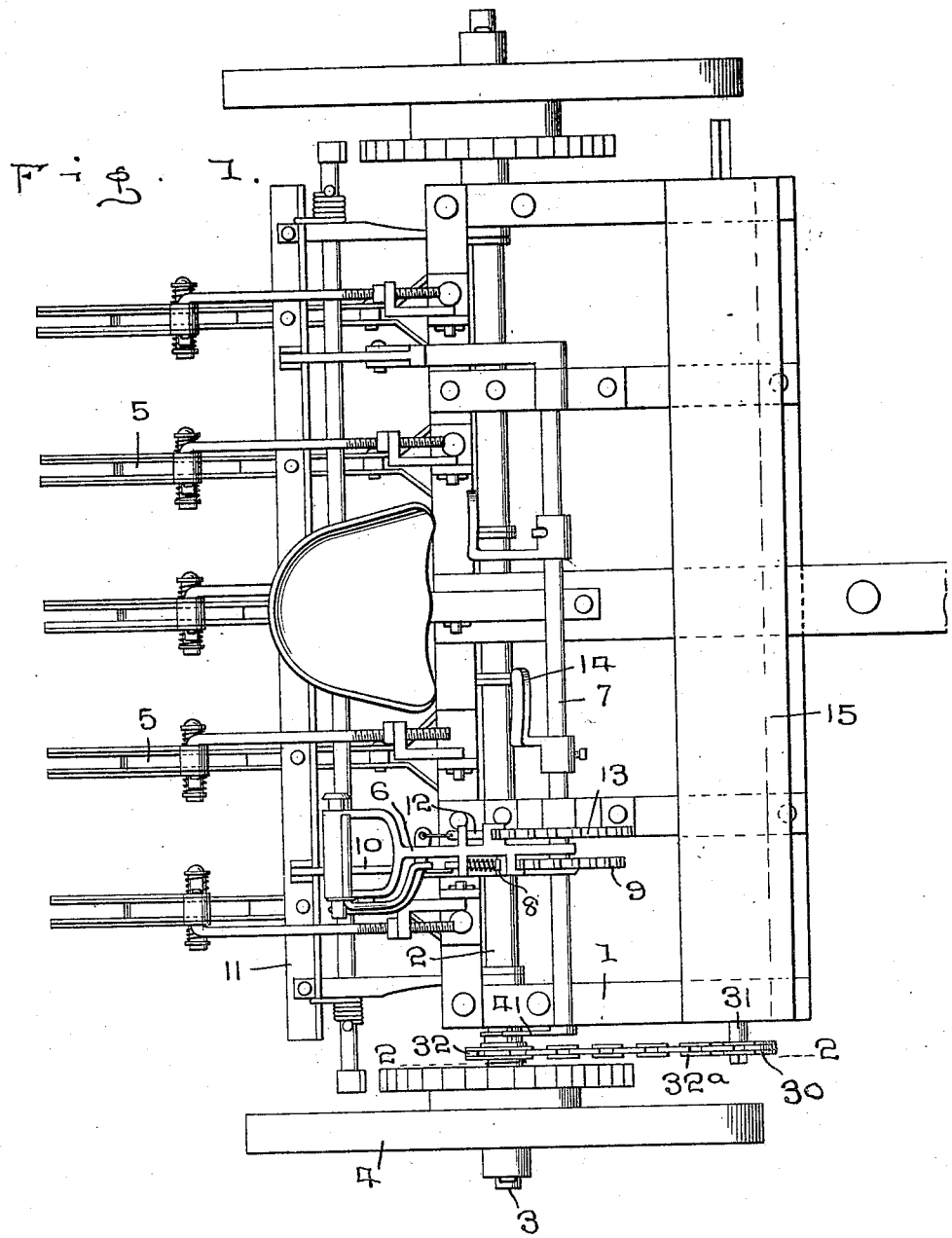
WITNESSES:
INVENTOR
C. W. Stark
BY
W. J. FitzGerald
Attorneys

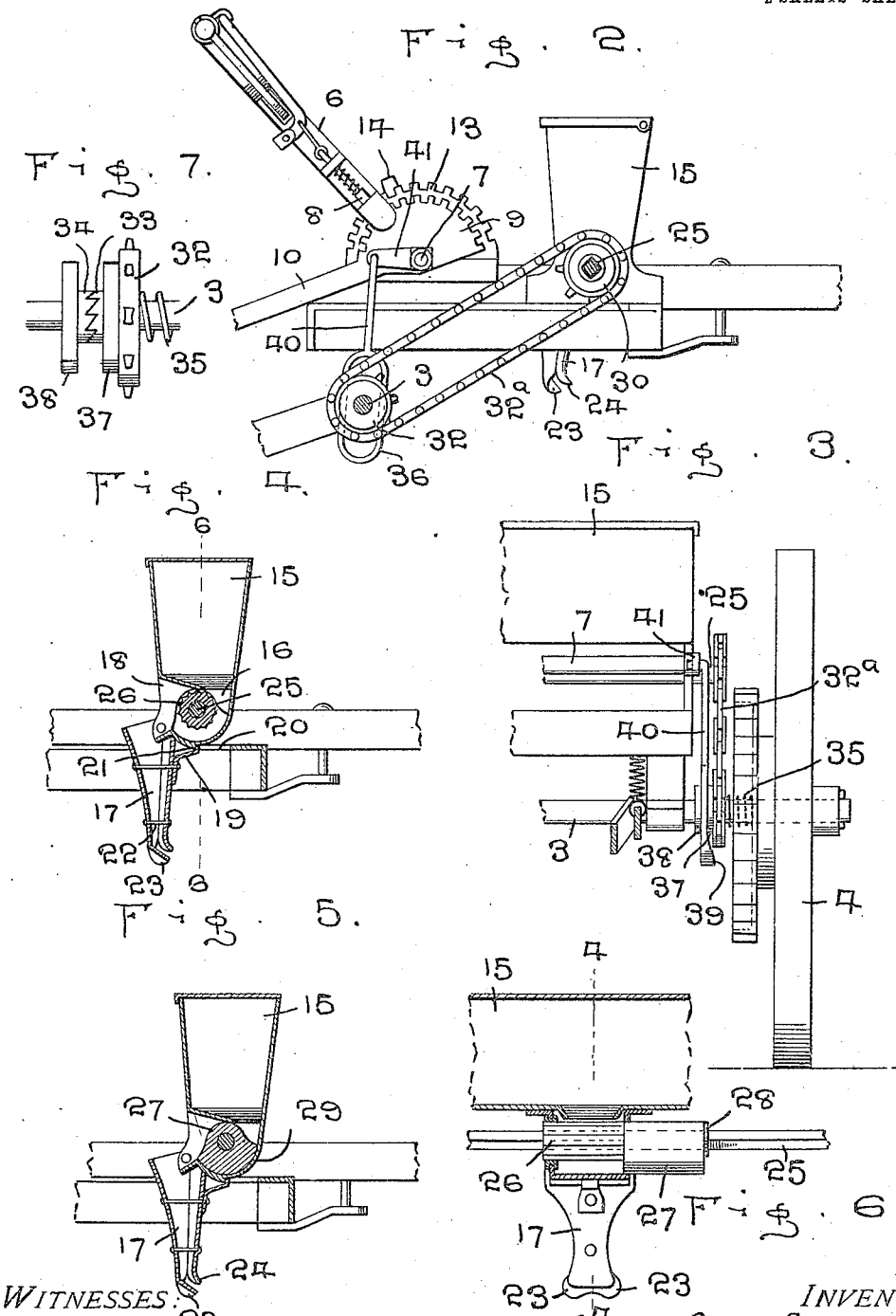

UNITED STATES PATENT OFFICE.

CHARLES W. STARK, OF MOUNTAIN LAKE, MINNESOTA.

SEEDER.

942,868. Specification of Letters Patent. Patented Dec. 7, 1909.

Original application filed October 20, 1908, Serial No. 458,660. Divided and this application filed June 15, 1909. Serial No. 502,290.

*To all whom it may concern:*

Be it known that I, CHARLES W. STARK, a citizen of the United States, residing at Mountain Lake, in the county of Cottonwood and State of Minnesota, have invented certain new and useful Improvements in Seeders; and I do hereby declare the following to be a full, clear, and exact description of the invention, such as will enable others skilled in the art to which it appertains to make and use the same.

My invention relates to new and useful improvements in seeders and more particularly to that class adapted to be employed for sowing grain, such as wheat, oats, and the like and my object is to provide means for attaching a seeder to that form of grass grubber and cultivator the application for which was patented by me August 10, 1909, said patent being numbered 930,996, and is the subject matter stricken from said case.

A further object is to provide means for feeding the seed into the down spouts or discharging nozzles of the seeder and a further object is to provide means for spreading the seed as said seed leaves the spout and a still further object is to provide means for operating the feeding mechanism of the seeder.

Other objects and advantages will be hereinafter referred to and more particularly pointed out in the claims.

In the accompanying drawings forming part of this application, Figure 1 is a top plan view of the cultivating device, showing the seed sowing mechanism attached thereto. Fig. 2 is a detail sectional view as seen on line 2—2, Fig. 1. Fig. 3 is a rear elevation partly in section of one end of the cultivator and seeding attachment. Fig. 4 is a vertical transverse sectional view as seen on line 4—4, Fig. 6. Fig. 5 is a similar view showing the feed graduating device or follower block in section. Fig. 6 is a sectional view as seen on line 6—6, Fig. 4, and, Fig. 7 is an elevation of a clutch mechanism employed in connection with the seeding attachment.

Referring to the drawings in which similar reference numerals designate corresponding parts throughout the several views, 1 indicates the frame of that form of cultivator shown and described in my former application which frame is preferably oblong and said frame is mounted on a tubular shaft 2, said shaft extending the full length of the frame and providing a bearing for the axle 3, the ends of the axle extending beyond the ends of the shaft and having mounted thereon supporting wheels 4.

Extending rearwardly from the tubular shaft 2, is a plurality of cultivating beams 5, to which are attached any suitable form of cultivating shovel and these beams are raised and lowered through the medium of a lever 6, said lever being mounted on a shaft 7, which shaft is in turn rotatably mounted on the frame 1 and by providing a latch 8 on the lever 6, which is adapted to coöperate with a rack 9 fixed to the shaft 7, the swinging of said lever forwardly or rearwardly will elevate or depress the beams 5 through the means of an arm 10 fixed to the rack 9 and a lift bar 11 at the opposite end of said arm 10, said lift bar being fixed in any suitable manner to the beams. The beams may be held in various suspended positions by providing an auxiliary latch 12 which coöperates with a rack 13 stationed on the frame 1 and by providing suitable means for operating said latches, the beams may be raised or lowered as desired and the depth to which the cultivating attachments on the beams may enter the soil, may be also regulated through the medium of the rack 13 and auxiliary latch coöperating therewith. The shaft 7 may be also rotated to elevate the beams by means of a foot lever 14, but as the aforesaid parts form no part of my present invention, it is not deemed necessary to further describe the same.

The seeding device is attached to the forward portion of the frame 1 and comprises a hopper 15, which extends the full length of the frame 1, said hopper being provided with a number of openings 16, through which the seed may pass into the down spouts 17, which spouts are hingedly secured to the housing 18 surrounding and depending from the openings 16. The spouts are normally held in their vertical position by means of spring tongues 19, said tongues being fixed at one end to the spouts 17, while the angular extensions 20 at the opposite ends of the tongues are adapted to engage shoulders 21 on the housings 18, the tension of said tongues being such as to normally hold the extensions in engagement with the shoulder and maintain the spouts in a vertical position.

The spouts 17 are preferably made in two sections and are held together in any preferred manner as by means of bolts 22, the lower end of the rear section of the spout being substantially fan shaped and having its central portion 23 curved upwardly, while the lower end of the forward section of the spout is curved outwardly to form a lip 24, the object in so arranging the discharging ends of the spouts being to cause the seed to scatter or be thrown a distance from each side of the spout as well as immediately below the same. The upwardly curved central portion 23 provides laterally inclined surfaces at the edges of the spouts, which will cause a portion of the seed when engaging the lower end portion of the spout, to move laterally from the center thereof, the momentum carrying the seed a distance to each side of the path of the spout, while the lip 24 will prevent the seed from rebounding or leaving the end of the spout directly in the path of the spout.

A shaft 25 is extended longitudinally of the hopper 15 and through the housings or cups 18, said shaft having fixed thereon force feed wheels 26, there being one of said wheels for each housing, the object of said wheels being to agitate the seed and force the same from the hopper into the spouts. The length of said wheels is such as to extend from end to end of the housings and, if it be desired to deliver or feed certain class of seed in less quantities than others, the shaft 25 is moved longitudinally, which will allow of moving the feed wheels partially out of their housings, and controlling or closing more or less the seed openings by certain means as presently disclosed, whereby a less amount of seed will be deposited in the spouts. When this result is accomplished, it becomes necessary to choke or more or less close the openings 16, which result is obtained by means of follow blocks 27, which blocks are likewise carried by the shaft 25, but instead of fixing the blocks to the shaft, said shaft is arranged to rotate in the blocks and they are caused to travel longitudinally with the force feed wheels by abutting one end of the blocks against the feed wheels and placing collars 28 on the shaft 25 at the opposite ends of the blocks. In this manner, it will be readily seen that as the shaft is moved longitudinally to lessen the feeding capacity of the wheels, the follow blocks will be moved into the housing and partially close the openings in the hopper, thereby retarding the flow of the seed from the hopper into the housing. The lower portions of the blocks 27 are curved and fit snugly in the curved bottoms 29 of the housings 18, the curvature of the face of the blocks and bottoms being such as to prevent the blocks from turning in the housing, thereby retaining the blocks at all times in position to move into or out of the housings.

The shaft 25 is positively driven by placing a sprocket 30 on one end of the shaft 25, said sprocket being provided with a sleeve 31, which sleeve is held in any suitable manner against longitudinal movement, but is left free to rotate with the shaft and the shaft is likewise longitudinally movable through the sleeve, whereby the shaft may be operated to position the feeding wheels and follow blocks without disturbing the position of said sprocket. A similar sprocket 32 is loosely mounted on the axle 3 and a chain 32$^a$ connects said sprockets, the sprocket 32 being provided on its inner face with a clutch 33, which clutch coöperates with a similar clutch face 34 fixed to the axle 3, the clutch face 33 being held in engagement with the clutch face 34 by means of a spring 35 and as the axle is positively driven by the wheels 4, it will be readily seen that so long as the clutch faces are interlocked with each other, the seeding attachment will be likewise operated. In order to disconnect the clutch faces and thereby stop the operation of the seeder, a link member 36 is positioned around the axle 3 and between collars 37 and 38 on the sprocket 32 and clutch 34, respectively, said link being oblong and provided with an outwardly curved lip 39, at its lower end, the remaining portion of the link being such as to permit the clutch faces to engage with each other when the link is in its lowered position, while the lip is so arranged that when the link is elevated, the clutch 33 will be moved out of engagement with the clutch 34, thereby permitting the sprocket 32 to remain stationary.

It is the object of the invention to stop operation of the seeder simultaneously with raising the cultivating beams and to this end, the upper end of the link 36 is provided with a stem 40, the upper end of the stem being pivotally secured to an arm 41, which arm is in turn fixed to the end of the shaft 7 and it will be readily seen that when the shaft 7 is rotated to raise and lower the beams 5, the link will be correspondingly raised and lowered and the clutch mechanism operated.

It will thus be seen that I have provided a very cheap and economical form of seeding device which may be readily attached to various classes of cultivators and more particularly to that class claimed by me in the application before mentioned and it will further be seen that I have provided means for effectually stopping the seeder in the operation of parts to disengage the cultivating attachments from the earth's surface. It will likewise be seen that by providing the force feeds and follow blocks, the amount of seed fed from the hopper may be readily regulated further, by hinging the spouts to the housing as shown and providing spring tongues for normally retaining the same in a vertical position, should the spouts come in contact with a solid object, the springs will yield sufficiently to be disengaged from the shoulders, whereupon the spouts will swing rearwardly and prevent breakage of the spouts. It will further be seen that by providing the fan structure at the lower ends of the spouts, the seed will be evenly distributed over the earth's surface.

What I claim is:

1. In a combined cultivator and seeding device, the combination with a frame, an axle on said frame, beams carried by the axle and means to raise and lower said beams; of a hopper carried by the frame, housings below said hopper, a shaft extending longitudinally of the hopper and through the housings, feeding devices fixed on said shaft follow-blocks arranged upon, and independent of, said shaft, a sprocket on said shaft, a similar sprocket on said axle, a chain extending around said sprockets, the sprocket on the axle having a clutch face, a similar clutch face on the axle and means adapted to operate simultaneously with the elevation of said beams to separate said clutch faces and stop the operation of the seeding attachment and means arranged upon said shaft adapted, with said feeding devices, to effect the longitudinal movement of said follow-blocks with the like movement of said shaft and feeding devices.

2. In a combined cultivating and seeding device, the combination with a frame, an axle carried by said frame, cultivating devices attached to said axle and means to raise and lower the cultivating devices; of a seed hopper carried by said frame and forwardly of said cultivating attachments, feeding devices below said hopper, means connected with the axle to drive said feeding devices, additional means coöperating with the cultivating attachment, elevating devices to disconnect the feed driving mechanism and stop the operation of the seeder, spouts hingedly secured below said hopper spring tongues applied to said spouts, and shoulders below said hopper adapted to be engaged by said spring tongues to normally hold said spouts in a vertical position.

3. In a seeding device, the combination with a hopper having openings therein; of housings having shoulders thereon, spouts hingedly secured to said housings and spring tongues on said spouts adapted to engage said shoulders and normally retain the spouts in vertical position.

In testimony whereof I have signed my name to this specification in the presence of two subscribing witnesses.

CHARLES W. STARK.

Witnesses:
ABR. JANZEN,
NETTIE E. STARK.